Dec. 9, 1924.  1,518,376
S. J. VERMAES ET AL
PROCESS FOR THE CHLORIDIZING VOLATILIZATION OF METALS
Filed April 15, 1922
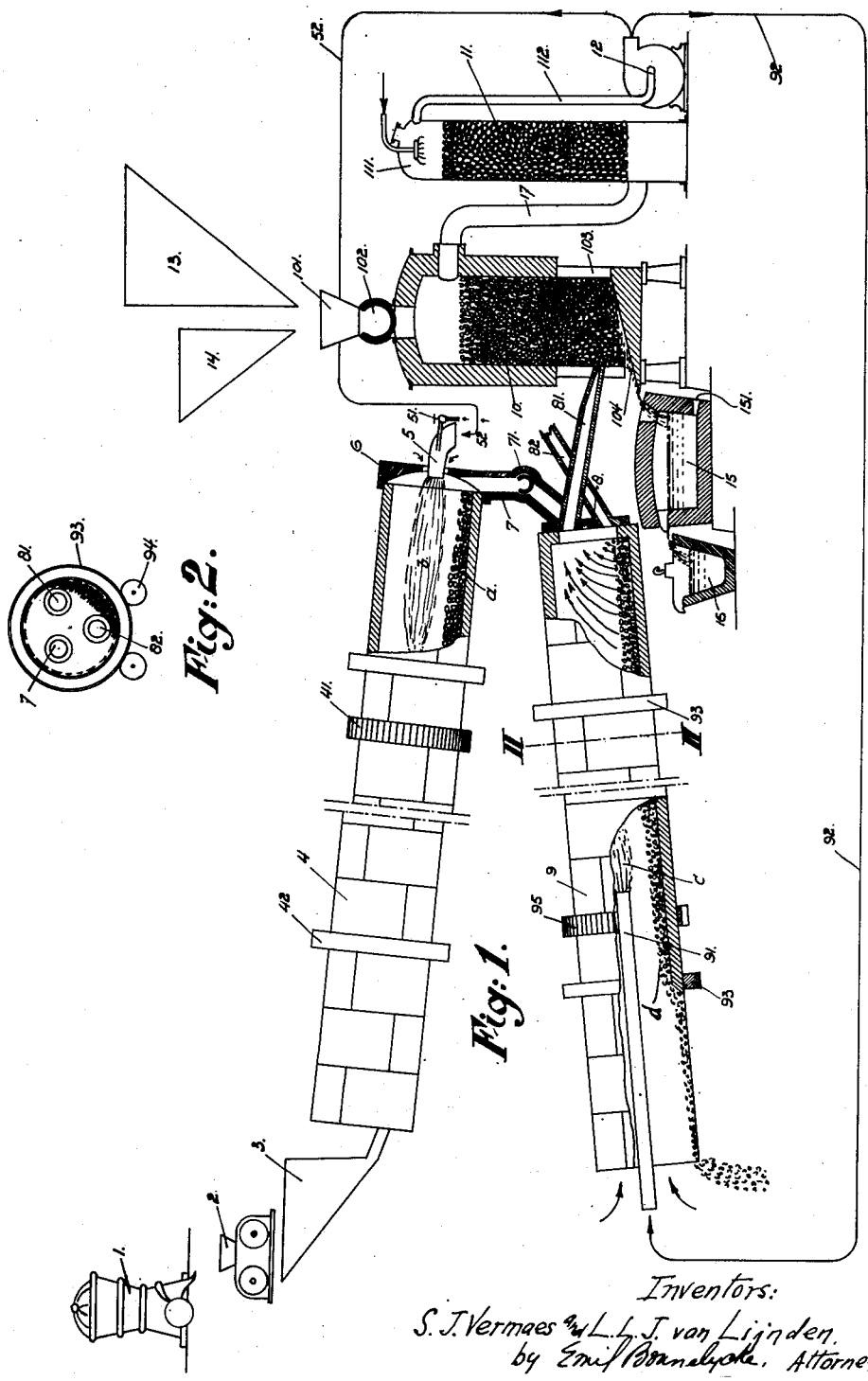
Inventors:
S. J. Vermaes and L. L. J. van Lijnden.
by Emil Bonnelycke, Attorney.

Patented Dec. 9, 1924.

1,518,376

UNITED STATES PATENT OFFICE.

STEFANUS JOHANNES VERMAES, OF DELFT, AND LEONARD LOUIS JACQUES VAN LIJNDEN, OF THE HAGUE, NETHERLANDS.

PROCESS FOR THE CHLORIDIZING VOLATILIZATION OF METALS.

Application filed April 15, 1922. Serial No. 553,037.

*To all whom it may concern:*

Be it known that we, STEFANUS JOHANNES VERMAES, of Oude Delft 170, Delft, Province of South Holland, Kingdom of the Netherlands, and LEONARD LOUIS JACQUES VAN LIJNDEN, of Nassau Dillenburgstraat 16, The Hague, Province of South Holland, Kingdom of the Netherlands, both subjects of the Queen of the Netherlands, have invented certain new and useful Improvements in or Relating to Processes for the Chloridizing Volatilization of Metals, of which the following is a specification.

It is known that by heating oxide or roasted sulfide ores with chloride of calcium or other chlorides of alkaline earths or alkalies, volatile metal chlorides are formed, and several processes have been proposed for separating the valuable metals from suitable ores by volatilizing the metals as chlorine compounds, collecting these compounds and separating the metals therefrom. Such processes are disclosed in United States Patents 1,264,586, 1,368,885 and 1,368,973.

A drawback of these processes is that the chlorine compounds obtained are much diluted with air or fuel gases and therefore it is very difficult to collect them without loss.

After many experiments a process has been found to increase considerably the concentration of the metal chlorides in the gases without undue increase of the time of working, so that the precipitation of the chlorides from the gases becomes easy and complete.

The new process consists in separating the operation of heating the ore to the required volatilizing temperature of the chloride from the operation of forming and volatilizing the chloride compounds of the valuable metals.

The ore is first heated in the most efficient way by direct, preferably oxidizing, heating to or above the necessary temperature for chloridizing volatilization, whereby at the same time non-refractory sulfates are decomposed. The ore is then discharged into the chloridizing furnace, which is maintained at the temperature required for the reaction, for example by indirect heating or by combustion of a small quantity of gas in the reaction chamber. In the chloridizing furnace the hot ore is mixed with, preferably heated, chloridizing agents with which it is stirred and with which it passes through the furnace, while an air- or gas-current is drawn through the furnace, preferably in countercurrent to the ore.

Because the chloridizing reaction requires little heat and the quantity of metal to be volatilized as a chlorine compound is only a comparatively small portion of the mass of ore, the direct or indirect heating of the chloridizing furnace is of but little importance and will chiefly consist in the total or partial compensation of unavoidable heat losses such as radiation or loss of heat from parts of the furnace which are accidentally or expressly cooled. The quantity of heat to be supplied to the chloridizing furnace may be very small, especially when the composition of the material to be treated is such that it can stand heating to a high temperature without sintering, because the heating in the first furnace may then be to a temperature which is considerably higher than that required for rapid chloridizing, so that the chloridizing furnace can lose this excess of heat without disadvantage.

A requirement for the desired short period of chloridizing is, that the chloride vapours produced are removed continually and rapidly from the ore. This may be effected in different ways, for instance, by vigorous stirring with the usual roasting hawks, or by a comparatively fast rotation of a rotary furnace or by sucking or forcing air or gas through the ore.

A simple method is the following: The ore is milled if necessary after a previous roasting to the required mesh and charged into a rotary kiln of the usual type, in which it is heated to the required temperature by direct contact with hot gases and flame and by radiation and contact with the hot walls. By admitting an excess of air, some oxidation will also occur, which completes the preliminary roasting or effects the roasting of the original small sulphur content of the ore.

From the preheating furnace the material falls in hot condition into a second rotary cylindrical furnace, which is heated throughout that portion of its length which is occupied by the travelling ore, while the latter is being chloridized; this heating is chiefly for compensating heat losses. Following this heated part is a part in which the wall is not heated and the ore is slowly cooled while formation of the chlorine compounds is completed; the ore then travels through a metallic extension of the rotary cylindrical furnace, which extension may be constructed in such manner that there is a rapid heat exchange between the heat in the tailings and the current of gas or air travelling in counter current therewith.

The upper end of the chloridizing furnace may be closed, openings being provided for charging the hot ore and chloridizing agent and for escape of the air or gas carrying the chlorine compounds. The gas carrying the chlorine compounds should be of a non-reducing character, as otherwise decomposition of the metallic chlorides would take place.

The chloridizing agent may be solid or molten chloride of calcium. The latter may be produced continually in the process of decomposing the vapour of the metal chloride which has been volatilized.

The lower end of the chloridizing rotary cylindrical furnace may be open, so that the tailings are continually discharged and air or combustion gases may enter under suction applied at the upper part, care being taken that the quantity of air or gas is not much larger than the quantity required to carry away the volatilized chloride compounds.

The incoming air takes up heat from the tailings so that only very little fuel is required for the heating. During its passage through the hot part of the chloridizing furnace the air is more and more charged with chlorine compounds and leaves the furnace at the upper end to be conducted to the plant in which the chlorides are collected or precipitated, or to be carried directly to a gas producer charged with lime and carbon as described in our co-pending application No. 553,036, filed of even date. In large scale laboratory experiments a copper ore containing 5% copper was mixed with 10% of calcium chloride and heated at a temperature of about 820° C.; in 90 minutes 94.9% of its copper was removed by an air current which per cubic millimeter (of 760 cm. pressure and 15% C.) temperature carried forward 100 grammes of metal.

It is expected that this high figure may be considerably increased in continuous operation in the manner described.

The accompanying diagrammatic drawing shows an apparatus with which the present process can be carried out in conjunction with the process of recovering metals from their chloride vapours as described in our above identified co-pending application; but it is to be understood that the invention is not limited to the use of the particular apparatus shown, nor to its application in conjunction with the aforesaid recovering process, but covers all modifications within the scope of the appended claims.

In the drawing, Figure 1 is a side elevation, partly in section, of the apparatus, and Fig. 2 is a cross-section through the chloridizing furnace on the line II—II, of Fig. 1.

Referring more particularly to the drawing, 1 indicates a so-called Gates crusher, 2 a roller mill, 3 a hopper or bin to receive the crushed ore, 4 a rotating preheating furnace into which the hopper discharges, and 5 a gas burner for heating the furnace 4. The air supply for the burner 5 is indicated at 51, and 52 indicates the gas-supply piping leading to said burner and through which the gas is forced by a fan 12.

6 is the fixed cover at the delivery end of the furnace 4, and 7 is a conduit leading therefrom and equipped with a valve 71, said conduit connecting the preheating furnace with the fixed end-cover 8 of the rotating chloridizing furnace 9. The cover 8 is further connected by a conduit 81 to a producer 10 and to a pipe 82 for the introduction of calcium chloride. The rotary chloridizing kiln 9 is heated by a gas burner 91 fed by gas delivered by the fan 12, the supply piping for the gas being indicated at 92.

The producer 10 is provided with a hopper 101 having a valve 102. The hopper 101 is fed with coke from a bin or hopper 13, and with lime from a bin or hopper 14. The lower part of the producer is provided with a water jacket 103 and a taphole 104 for molten medal and molten chloride. 15 is a hearth in which molten metal and chloride are collected and separated, the chloride flowing to a smaller tank 16 and the metal being discharged through the taphole 151. The upper part of the producer is connected by a gas conduit 17 to the scrubber 11, filled with limestone and provided with a water spray 111 and a gas discharge tube 112 leading to the fan 12. 93 are rings encircling the rotary kiln 9 and provided with grooves (not shown in Fig. 1) to receive the supporting rollers 94 (Fig. 2). Similar rings 42 are fitted on the kiln 4, and 41 and 95 are ring gears by which the kilns 4 and 9 are rotated.

Fresh ore is fed into the crusher 1 and is further comminuted in the mill 2, for example to 5 mesh. The crushed ore is then fed into the bin 3 and from there into the preheating kiln 4. Here the ore $a$ is heated by direct contact with a flame $b$ to a temperature which is preferably higher than the chloridizing temperature, for instance, 900–1000° C. It is discharged in this hot condition through the valved connection 7 into the chloridizing kiln 9 in which it is mixed with calcium chloride or other chloride, preferably in molten condition, which is introduced through the conduit 82. The mixture is heated by the oxidizing flame $c$, to a temperature, for instance, of 800–900° C., and gives up its metal in the form of chloride which is volatilized and leaves the furnace through the conduit 81.

The hot tailings $d$ preheat the air entering the open lower end of the kiln 9. The kiln 4 is of the ordinary rotary type as used, for example, in the manufacture of Portland cement, but has a fixed end-cover 6 through which projects the burner 5 for preheating the ore in the furnace. The connection 7 and valve 71 are made of highly refractory material, as also are the conduits 81 and 82.

The kiln or furnace 9 is also of the ordinary rotary type, but its lower portion has no inner covering of refractory bricks, as the ore becomes sufficiently cool in this part of the furnace. The temperature in this furnace between the upper end and the flame is maintained by the flame at about 800–900° C., the part between the flame and the lower end becoming gradually cooler and acting as a heat-exchanger with the incoming air. The flame $b$ is much larger and bears much more heat than the flame $c$, the latter serving chiefly to compensate unavoidable heat-losses caused by radiation and the like.

The producer 10 is fed through the hopper 101 with a mixture of lime and coke which becomes incandescent when descending into the producer. The lower part is extremely hot and is therefore cooled by the water-jacket 103.

In the presence of the excess of incandescent coke, the oxygen of the gases introduced by the conduit 81, is converted into CO. The metallic chloride is reduced by coke or CO, in the presence of lime, to metal with formation of calcium chloride. Both the metal and the calcium chloride melt in the hot zone of the producer and are discharged through the taphole 104 into the collecting and separating hearth 15. The metal is discharged through the taphole 151 and the calcium chloride flows over to the small tank 16. From this tank it is fed into the kiln 9 to serve as a chloridizing agent.

The CO formed in the hot zone of the producer flows through the conduit 17 into the scrubber 11 in which it is cooled by the water spray. This water also acts to absorb all traces of metal chlorides or formed hydrochloric acid, which may still be contained in the gases and which are fixed by the limestone.

In the whole system, draft is obtained by the fan 12 to which the gases flow after passing through the scrubber. The gases leaving the producer have a very high caloric value and therefore are used for heating both the rotary kilns 4 and 9. The quantity of gas may be controlled by admitting more or less air into the lower part of the producer, and air may also be introduced into the kiln 9 or admitted by openings (not shown) in the lower part of the producer 10, preferably above the zone in which the metal chlorids are reduced to metals.

What we claim is:

1. A process of obtaining metallic chlorides from ores, which consists in preheating the ore in an oxidizing atmosphere to a temperature above the temperature required for the chloridizing and volatilizing in the process, transporting the hot ore to a place where it is mixed with a chloridizing agent, agitating the mixture while maintaining a temperature required for the formation and volatilization of the desired metallic chlorides, and removing by a slow current of non-reducing gas the metallic chloride vapours formed.

2. A process of obtaining metallic chlorides from ores, which consists in preheating the ore in an oxidizing gas current sufficiently to oxidize metallic sulphids, to decompose non-refractory sulphates and to raise the temperature of the ore above that required for the chloridizing and volatilizing steps in the process, transporting the hot ore to a place where it is mixed with a chloridizing agent, agitating the mixture while maintaining the temperature required for the formation and volatilization of the desired metallic chlorides, and removing by a slow current of non-reducing gas the metallic chloride vapours formed.

3. A process of obtaining metallic chlorides from ores, which consists in preheating the ore in an oxidizing atmosphere to a temperature above that required for the chloridizing and volatilizing steps in the process, transporting the hot ore to another furnace which is heated to a less degree and in which the ore is mixed with a chloridizing agent, agitating the mixture while maintaining the temperature required for the formation and volatilization of the desired metallic chlorides, and removing by a slow current of non-reducing gas the metallic chloride vapours formed.

4. A process of obtaining metallic chlorides from ores which consists in preheating the ore in an oxidizing atmosphere to a temperature above that required for the chloridizing and volatilizing steps in the process, transporting the hot ore to another furnace in which the temperature is prevented from falling below the point required, for the chloridizing volatilization of the metals, mixing the ore with an alkaline earth metal chloride, agitating the mixture and removing by a slow current of non-reducing gas the metallic chloride vapours formed.

5. A process of obtaining chloride of copper, which consists in preheating a cupriferous ore in an oxidizing atmosphere to a temperature above 800° C., transporting the hot ore to another furnace where it is mixed with molten calcium chloride, agitating the mixture while maintaining a temperature of about 800° C., and removing by a slow current of non-reducing gas the copper chloride vapours formed.

In testimony whereof we affix our signatures.

STEFANUS JOHANNES VERMAES.
LEONARD LOUIS JACQUES van LIJNDEN.